United States Patent [19]

Prieto

[11] 3,846,751

[45] Nov. 5, 1974

[54] FOUR-BIT PARITY CHECKER/GENERATOR

[75] Inventor: Anthony Prieto, Tulsa, Okla.

[73] Assignee: Telex Computer Products, Inc., Tulsa, Okla.

[22] Filed: June 12, 1973

[21] Appl. No.: 369,166

[52] U.S. Cl. .......................................... 340/146.1 AG
[51] Int. Cl. .............................................. G06f 11/10
[58] Field of Search ......... 340/146.1 AJ, 146.1 AG; 235/153 BB

[56] References Cited

UNITED STATES PATENTS

| | | | |
|---|---|---|---|
| 3,150,350 | 9/1964 | Goldman | 340/146.1 AG |
| 3,466,602 | 9/1969 | Moser et al. | 340/146.1 AG |
| 3,693,152 | 9/1972 | Hong | 340/146.1 AG |

*Primary Examiner*—Joseph F. Ruggiero
*Assistant Examiner*—James F. Gottman
*Attorney, Agent, or Firm*—Head & Johnson

[57] ABSTRACT

This disclosure described a parity checker/generator which utilizes as its basic central portion, a commercial integrated circuit chip called a data selector/multiplexer. The data selector/multiplexer has provision for eight input terminals three data select terminals and an output terminal. By proper selection of the bits introduced into each of the three data select terminals, one and only one of the eight input terminals is connected to the output terminal. By selectively incrementing the binary number introduced into the data terminals, the eight input terminals can be selectively and sequentially connected to the output. This is the normal use of this device as a multiplexer. In this application one of the data input terminals is connected, with the three data select terminals, as a four input terminal parity checker. Depending on the bits present on the four input terminals the output will be a logic one or zero in accordance with the selected convention, to make an even or odd parity checker.

11 Claims, 5 Drawing Figures

FOUR-BIT PARITY CHECKER/GENERATOR

BACKGROUND OF THE INVENTION

This invention is in the area of digital data handling. More particularly, it is in the area of checking and correcting bit errors in digital data storage systems. Still more particularly it is concerned with the checking of the quality of the data by calculating the proper parity for a given digital word and comparing the calculated parity bit with the recorded parity bit to see if an error has occurred.

In the prior art great use has been made of recording parity symbols, or bits, to identify a group of bits known as words, bytes or other groupings. This parity symbol, or digital bit, travels with the digital words and can be checked at intervals to determine whether an error has been made in one or more of the bits, which error would involve a change in the parity bit.

In the prior art such parity checking circuits have been specially designed for the purpose and have been constructed out of individual gates and/or other circuit elements. However, in the computer art there have been a large number (in the tens of hundred or larger) of special integrated circuits, which are designed for specific purposes, common in the digital computer art. While these integrated circuits are designed for specific purpose, it is economical to use them for other purposes, whenever possible, because in a small space they provide a large plurality of individual circuit elements such as gates, diodes, inverters, etc. Therefore, if such an integrated circuit designed for a first purpose can be put to use in a second purpose there is a great advantage in volume, cost and simplicity of added circuitry, to make a more useful and satisfactory overall design.

SUMMARY OF THE INVENTION

It is a primary object of this invention to provide a circuit, which in conjunction with a conventional data selector/multiplexer, common in the art to provide a simplified circuit for a four bit parity checker. It is a further object of this invention to combine two eight bit multiplexer chips to form an eight bit parity checker. These and other objects are realized and the limitation of the prior art are overcome in this invention by using as a basic circuit an eight input data selector/multiplexer which is a commercial on-the-shelf item. The basic purpose of this multiplexer is to select one of the eight input leads and connect it to an output lead.

In this invention, the three address terminals or data select terminals, and one of the data terminals are combined as a group of four input terminals, to generate on the output terminal a logic 1 or 0, in accordance with an even parity convention, which calls for either a 1 or a 0 if there are an even or an odd number of 1's in the input data leads. In the alternate parity convention odd parity, a 0 or a 1 is generated in accordance with an even or an odd number of 1's in the input data leads.

BRIEF DESCRIPTION OF THE DRAWINGS

These and other objects of this invention and a better understanding of the principles and details of the invention will be evident from the following description taken in conjunction with the appended drawings, in which:

FIGS. 1 and 2 represent prior art.

DESCRIPTION OF THE PREFERRED EMBODIMENTS

Figure 1:
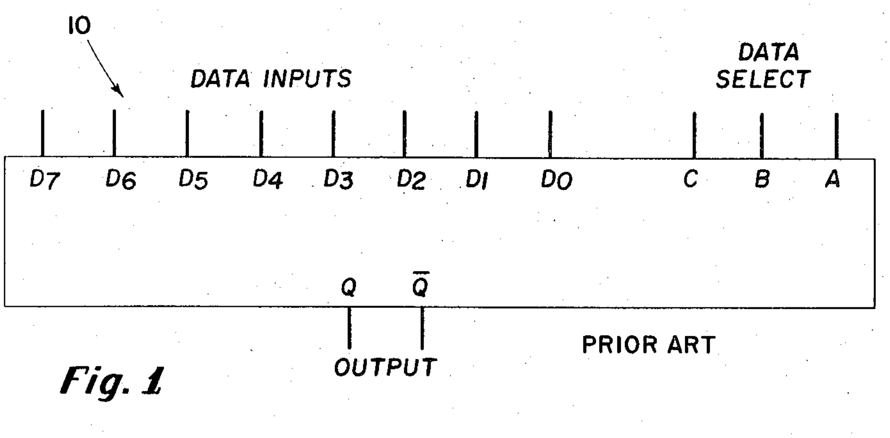
FIGS. 1 and 2 represent the logic diagram and the internal circuit diagram of a conventional data selector/-multiplexer integrated circuit chip. Among the devices which provide this type of circuit are the SN54S151 or SN74S151 chips, which are manufactured by the Texas Instrument Company of Dallas, Texas. Other manufacturers make corresponding circuit chips and they, of course, may be used in this application.
Figure 2:
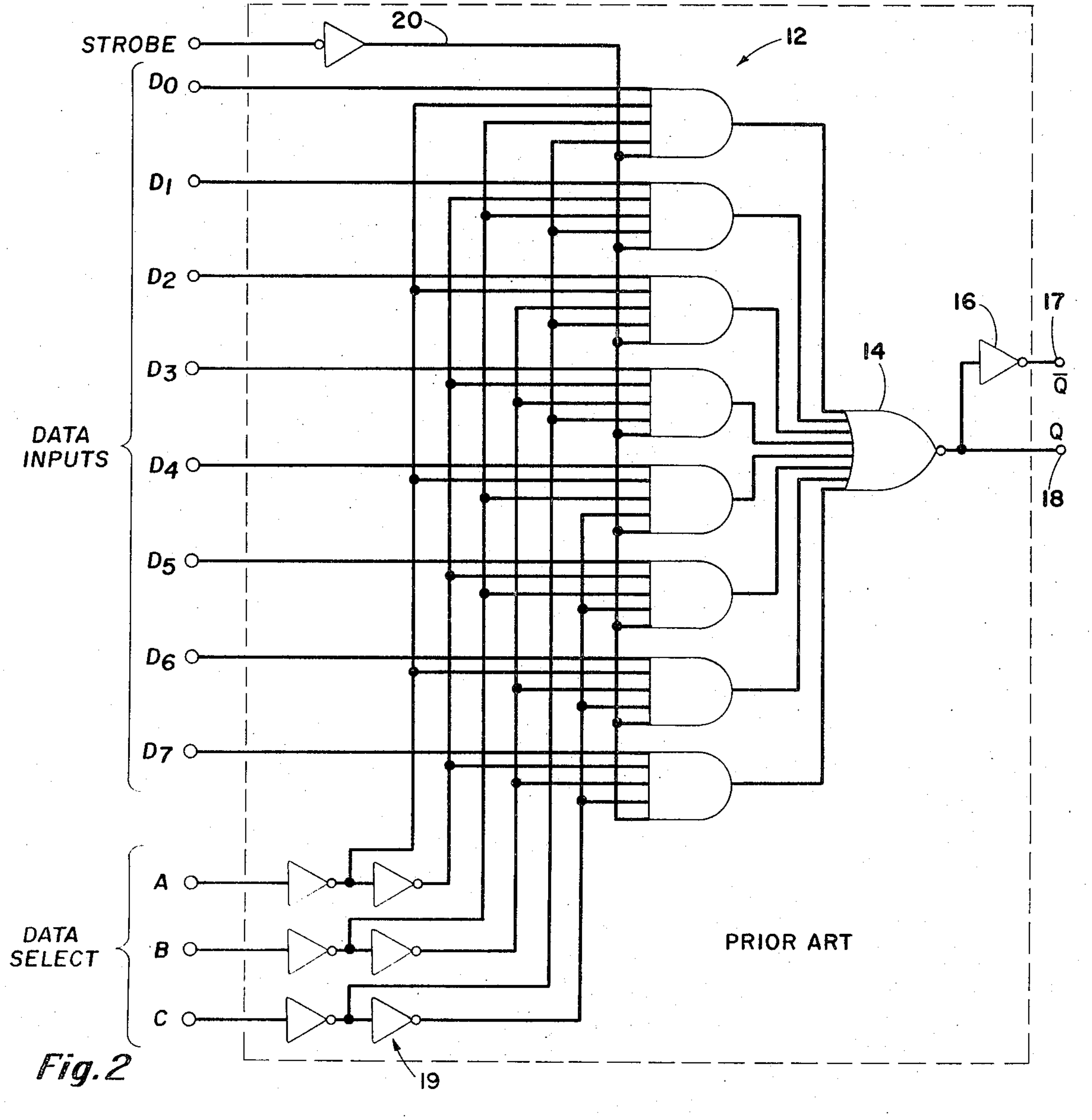

Referring to the drawings and in particular to FIGS. 1 and 2 there are shown the logic diagram of a type S151 data selector/multiplexer of commercial design. The circuit of FIG. 2 is the detail inner circuitry of such an integrated circuit device. The chip is designed for eight data inputs D0, D1, D2, D3, D4, D5, D6 and D7, three data select or address inputs A, B and C, and two output terminals Q and $\overline{Q}$.

The internal circuit shown in FIG. 2 will not be described in great detail since it is a well known circuit device, which is available on the market and is thoroughly described in the catalogs provided by the manufacturer. Suffice to say that there are a group of eight AND gates 12, the outputs of which are combined into an eight input NOR GATE 14. There are two outputs, one 18 direct and one 17 through an inverter 16. The direct output 18 is labelled $\overline{Q}$. There are three inputs A, B and C, and by means of inverters 19 there are added three additional controls on the AND gates, which provide A, $\overline{A}$, B, $\overline{B}$, C, $\overline{C}$, inputs to the gates 12. The strobe circuit 20 is used to enable the system.

The operation of the circuit of FIG. 2 can be illustrated by the Functional Table 1 which follows.

FUNCTIONAL TABLE 1

| DATA SELECT | DATA INPUTS | | | | | | | | OUTPUT |
|---|---|---|---|---|---|---|---|---|---|
| C B A | D7 | D6 | D5 | D4 | D3 | D2 | D1 | D0 | Q |
| 0 0 0 | X | X | X | X | X | X | X | 1 | 1 |
| 0 0 1 | X | X | X | X | X | X | 1 | X | 1 |
| 0 1 0 | X | X | X | X | X | 1 | X | X | 1 |
| 0 1 1 | X | X | X | X | 1 | X | X | X | 1 |
| 1 0 0 | X | X | X | 1 | X | X | X | X | 1 |
| 1 0 1 | X | X | 1 | X | X | X | X | X | 1 |
| 1 1 0 | X | 1 | X | X | X | X | X | X | 1 |
| 1 1 1 | 1 | X | X | X | X | X | X | X | 1 |

In the table there are three data select columns marked A, B, C. There are eight data input columns marked D0 to D7 and there is an output column which represents the Q output. By the normal digital logic system for a 0, 0, 0 input, representing the A, B and C inputs, the D0 input will be connected to the output. As the data select inputs are incremented so that the A input becomes a logic 1, terminal D1 is then connected to the output. When the address increments another step so that the B terminal is a 1 the D2 input is connected to the output, and so on, successively through eight steps. The data on the individual terminals D0 to D7 are sequentially placed on the output Q lead. This type of operation can be traced through on the circuit FIG. 2, which is well known, and need not be repeated at this time.

The diagrams of FIG. 1 and FIG. 2 are well known in the art and are marked on the drawings as prior art. The novelty of this invention lies in the way these circuits are used and in the additional circuitry employed.

Figure 3:
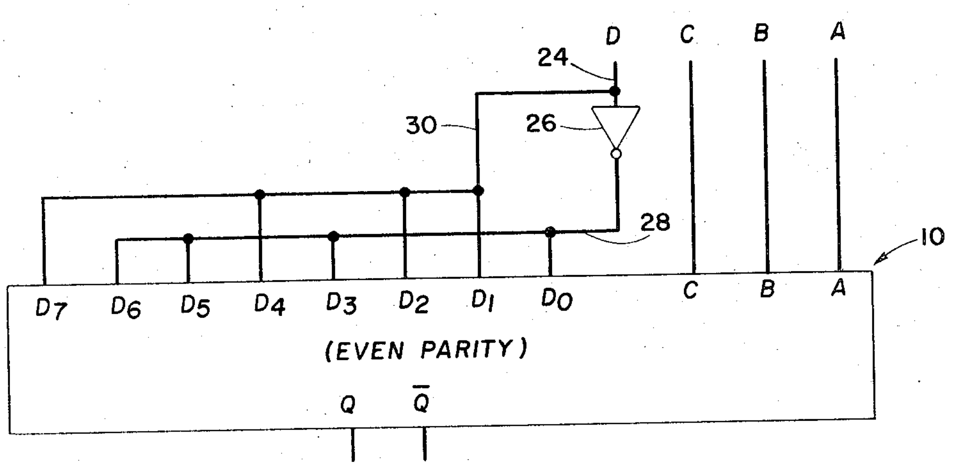
FIGS. 3 and 4 indicate the logic diagram of an even parity checker and an odd parity checker, using the S151 chips.

Consider the illustration of FIG. 3. This is similar to FIG. 1 except that the D0, D3, D5 and D6 inputs have been tied together by lead 28 and the D1, D2, D4 and D7 leads have been tied together by the lead 30. The four input leads to the parity checker of FIG. 3 now comprise the leads A, B, C and a D lead 24 which connects directly to the lead 30, and through an inverter 26 to the lead 28. Consider FIG. 3 as a four bit parity checker.

The operation of a parity checker is generally as follows. Consider that there are four bits which are received in parallel, representing the signals on the lines A, B, C and D. If an even parity convention is required, the Functional Table 2 indicates the signals on each of the four inputs and correspondingly on the output.

FUNCTIONAL TABLE 2

| INPUT D | INPUT C | INPUT B | INPUT A | OUTPUT Q | SUM |
|---|---|---|---|---|---|
| 0 | 0 | 0 | 0 | 1 | EVEN |
| 0 | 0 | 0 | 1 | 0 | ODD |
| 0 | 0 | 1 | 0 | 0 | ODD |
| 0 | 0 | 1 | 1 | 1 | EVEN |
| 0 | 1 | 0 | 0 | 0 | ODD |
| 0 | 1 | 0 | 1 | 1 | EVEN |
| 0 | 1 | 1 | 0 | 1 | EVEN |
| 0 | 1 | 1 | 1 | 0 | ODD |
| 1 | 0 | 0 | 0 | 0 | ODD |
| 1 | 0 | 0 | 1 | 1 | EVEN |
| 1 | 0 | 1 | 0 | 1 | EVEN |
| 1 | 0 | 1 | 1 | 0 | ODD |
| 1 | 1 | 0 | 0 | 1 | EVEN |
| 1 | 1 | 0 | 1 | 0 | ODD |
| 1 | 1 | 1 | 0 | 0 | ODD |
| 1 | 1 | 1 | 1 | 1 | EVEN |

If the four inputs are 0, the output on Q will be a 1 and the sum will indicate an even parity. If there is a single 1 which may be on leads A, or B or C or D, the output will show a 0, or odd parity. If there are two 1's as on leads A and B, or A and C or B and C or A and D, or B and D or C and D, that is, an even number of 1's, the output will be a logic 1.

To check the operation of the circuit of FIG. 3 consider the Functional Table 2 which represents the operation of the chip 10. Consider that the data select shows a 0, 0, 0 on the A, B, C lines and similarly a 0 on the D line. If all four inputs are 0 there should be a 1 on the output. Consider the input a logic 0 on the line 24. The inverter 26 puts a 1 on lead 28 which connects to D0. With A, B, C inputs 0, 0, 0, D0 is connected to Q. This is shown in the first line of Table 2. Consider the second line of Table 2 with a 1, 0, 0 on A, B and C, and a 0 on the D line. In FIG. 3 the D lead 24 has a 0 and this is connected by lead 30 to the D1 input. Since the D1 input is connected to the output Q, this puts a logic 0 on the output.

In the next step, putting a 0, 1, 0 on the three inputs and a 0 on the D input the same 0 on lead 30 is connected to the D2 input, which is selected, and since that input is 0, the output on the Q terminal will be 0, and so on. By following through the circuitry it will be seen that, dependent upon the logic inputs on the A, B, C and D terminals, according to Table 2 the proper logic symbols 1 or 0 will appear on the output Q lead in accordance with Table 2.

Figure 5:
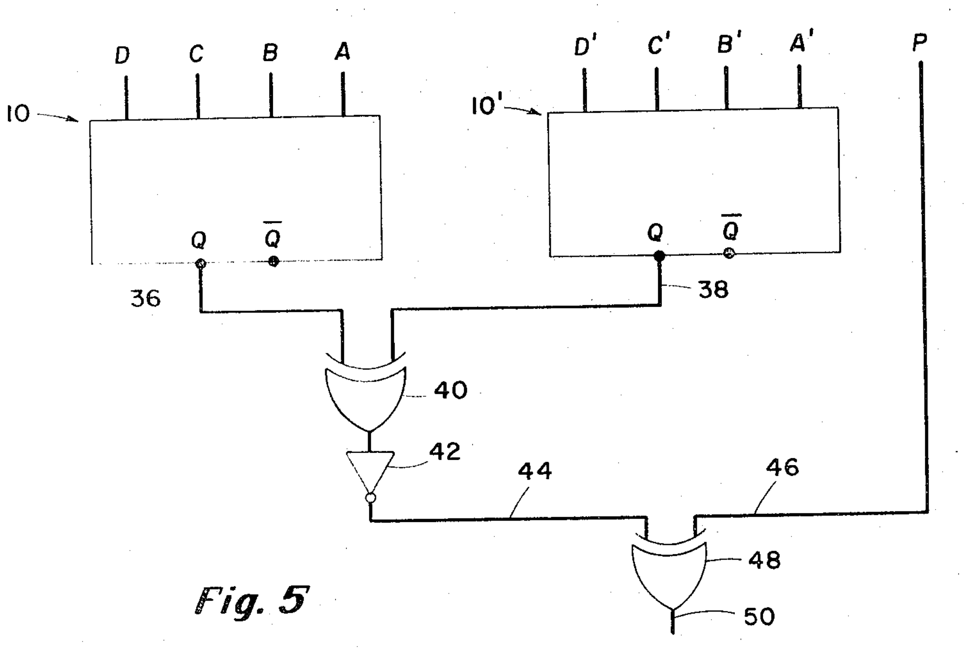
FIG. 5 indicates the additional circuitry required as an eight bit parity checker.

As indicated in FIG. 3 the eight input multiplexer 10 provides a parity checker of four bits. In most computer circuits there are eight or more data channels. To handle eight data channels it will require two of the chips indicated by numeral 10. In FIG. 5 is shown a circuit which combines two such chips 10 and 10', the first with A, B, C and D inputs and the second one with A', B', C' and D' inputs, each one with Q and $\overline{Q}$ outputs. It will be clear from Table 2 that when the four inputs are either 0, or have an even number of 1's, there will be a 1 on the Q output. Consider that all the inputs A, B, C and D and A', B', C', and D' are zero. The Q lead 36 and the Q lead 38 will show 1's. What is necessary is to combine these two outputs so that only when there is a logic 1 and a logic 0 on the two leads will there be an output logic 1 signal. This is done by means of an exclusive OR gate 40, the two inputs of which are leads 36 and 38 from the two chips 10 and 10'.

The exclusive OR gate has a truth table which is indicated in Functional Table 4.

FUNCTIONAL TABLE 4

| B | A | C | $\overline{C}$ |
|---|---|---|---|
| 0 | 0 | 0 | 1 |
| 0 | 1 | 1 | 0 |
| 1 | 0 | 1 | 0 |
| 1 | 1 | 0 | 1 |

This shows that when the A and B inputs are opposite, that is, the A is a 1 and the B is 0, or vice versa, there will be a logic 1 on output C. When it is desired to have an odd parity the column C shows what is desired, that is, if all the inputs were 0 the leads 36 and 38 will show 0's what is required is a 1. An inverter 42 connected to the exclusive OR gate 40 will provide a 1 on lead 44.

The line P is the ninth input from the data circuit, which is the parity circuit. It is desired to determine whether the parity bit calculated on lead 44 matches the parity bit on lead 46. This is done by means of the exclusive OR gate 48 which has an output on lead 50. Again by reference to Table 4 it is seen that when the two symbols on leads 44 and 46 are the same, the C output of the exclusive OR gate shows a 0 on the output lead 50 and that is what is desired. In other words, when the calculated or check parity and the recorded parity are the same, there is no signal output from the OR gate 48 and therefore this indicates proper parity.

In the normal operation of a parity checker in different conventions, different combinations are required. That is, in an even parity shown in the Table 2 when the number of 1's are even, the parity output on the Q lead is a 1. By referring to Functional Table 3 it is seen that in odd parity the reverse is true, that is, when the number of 1's is odd the output is a 1, and conversely, when the number of 1's is 0 or an even number, the output on the Q lead is a 0.

FUNCTIONAL TABLE 3

| INPUT | | | | OUTPUT | SUM |
|---|---|---|---|---|---|
| D | C | B | A | Q | |
| 0 | 0 | 0 | 0 | 0 | EVEN |
| 0 | 0 | 0 | 1 | 1 | ODD |
| 0 | 0 | 1 | 0 | 1 | ODD |
| 0 | 0 | 1 | 1 | 0 | EVEN |
| 0 | 1 | 0 | 0 | 1 | ODD |
| 0 | 1 | 0 | 1 | 0 | EVEN |
| 0 | 1 | 1 | 0 | 0 | EVEN |
| 0 | 1 | 1 | 1 | 1 | ODD |
| 1 | 0 | 0 | 0 | 1 | ODD |
| 1 | 0 | 0 | 1 | 0 | EVEN |
| 1 | 0 | 1 | 0 | 0 | EVEN |
| 1 | 0 | 1 | 1 | 1 | ODD |
| 1 | 1 | 0 | 0 | 0 | EVEN |
| 1 | 1 | 0 | 1 | 1 | ODD |
| 1 | 1 | 1 | 0 | 1 | ODD |
| 1 | 1 | 1 | 1 | 0 | EVEN |

Figure 4:
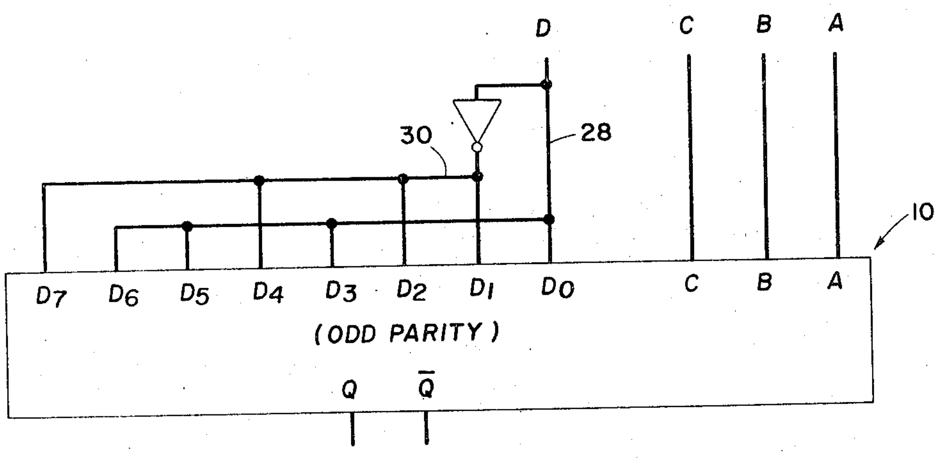

This is accomplished in FIG. 4 by connecting the inverter 26 in the lead 30 rather than in the lead 28. In this case the output on the Q lead will be the opposite logic symbol. This is shown by the truth table of Functional Table 3 compared to the Table 2 where the output signals 0 and 1 are interchanged between the two tables.

Of course, another way of accomplishing this is to leave the inverter 26 in the lead 28 and use of the $\overline{Q}$ outputs of the chips 10. These are of opposite or inverted logic signal, to the Q outputs. Thus connecting the leads 36 and 38 to the $\overline{Q}$ terminals, will change the diagram of FIG. 5 from an even parity operation to an odd parity operation. This would be equivalent to the change between FIGS. 3 and FIG. 4 to convert from even to odd parity.

It will be clear, of course, that two simultaneous changes, such as moving the inverter 26 to the lead 30 and also changing leads 36 and 38 to the $\overline{Q}$ terminals, will leave the operation of the system unchanged. Also, while the manner of combining two four bit parity checkers to form one eight bit parity checker is shown, it will be clear that more than two four bit checkers can be combined, with proper logic, to form checkers with more than eight input terminals.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A four bit parity checker comprising:

a. an eight bit data selector/multiplexer integrated circuit having three input address terminals, eight data input terminals and at least one Q output terminal and including means to connect said eight data terminals into two sets of four each, a first set comprising terminals $D_1$, $D_2$, $D_4$, $D_7$ and the second set comprising terminals $D_0$, $D_3$, $D_5$, $D_6$;

b. means to connect three data circuits to said three input address terminals;

c. means to connect a fourth data circuit to one of the said two sets of data input terminals; and d. means also to connect said fourth data circuit through inverter means to the other of said two sets of data terminals.

2. The parity checker as in claim 1 in which said fourth data circuit is connected to said first set of data terminals, and through said inverter to said second set.

3. The parity checker as in claim 2 in which the output terminal of said parity checker is said Q terminal.

4. The parity checker as in claim 2 including an inverted Q terminal, and in which the output terminal of said parity checker is said Q terminal.

5. The parity checker as in claim 1 in which said fourth data circuit is connected to said second set of data terminal, and through said inverter to said first set.

6. The parity checker as in claim 5 in which the output terminal of said parity checker is said Q terminal.

7. The parity checker as in claim 5 including an inverted $\overline{Q}$ terminal, and in which the output terminal of said parity checker is said $\overline{Q}$ terminal.

8. An eight bit parity checker comprising:

a. two four bit parity checkers each comrising;

1. An eight bit data selector/multiplexer integrated circuit having three input address terminals eight data input terminals and at least one Q output terminal and including means to connect said eight data terminals into two sets of four each a first set comprising terminals $D_1$, $D_2$, $D_4$, $D_7$ and the second set comprising terminals $D_0$, $D_3$, $D_5$, $D_6$;

2. means to connect three data circuits to said three input address terminals;

3. means to connect a fourth data circuit to one of the said two sets of data input terminals; and

4. means also to connect said fourth data circuit through inverter means to the other of said two sets of data terminals;

b. a first exclusive OR gate means having two input terminals connected respectively to the corresponding outputs of said four bit parity checkers; and c. inverter means connected to the output of said first exclusive OR gate means.

9. The eight bit parity checker as in claim 8 in which said corresponding outputs are the Q terminals of said two four bit parity checkers.

10. The eight bit parity checker as in claim 8 in which said corresponding outputs are the $\overline{Q}$ terminals of said two four bit parity checkers.

11. The eight bit parity checker as in claim 8 including a second exclusive OR gate means, one input terminal connected to said inverter and the second input terminal connected to the parity channel corresponding to the eight data channels connected to said inputs.

* * * * *